United States Patent
Senoo

(10) Patent No.: US 8,040,429 B2
(45) Date of Patent: Oct. 18, 2011

(54) ELECTRONIC APPARATUS HAVING AUTOFOCUS CAMERA FUNCTION

(75) Inventor: Hidemitsu Senoo, Osaka (JP)

(73) Assignee: Kyocera Corporation, Kyoto (JP)

(*) Notice: Subject to any disclaimer, the term of this patent is extended or adjusted under 35 U.S.C. 154(b) by 387 days.

(21) Appl. No.: 12/409,269

(22) Filed: Mar. 23, 2009

(65) Prior Publication Data

US 2009/0244358 A1    Oct. 1, 2009

(30) Foreign Application Priority Data

Mar. 25, 2008 (JP) .................. 2008-077958
Mar. 18, 2009 (JP) .................. 2009-065452

(51) Int. Cl.
G03B 13/00 (2006.01)
(52) U.S. Cl. .......................... 348/354; 396/92
(58) Field of Classification Search .......... 348/345, 348/350, 353, 354; 396/92, 102, 111, 121, 396/123
See application file for complete search history.

(56) References Cited

U.S. PATENT DOCUMENTS 7,133,078 B2 * 11/2006 Nagasawa ................ 348/353
7,822,334 B2 * 10/2010 Ono et al. ................ 348/353
2005/0001924 A1 * 1/2005 Honda ..................... 348/348
2009/0115882 A1 * 5/2009 Kawarada ................ 348/350

FOREIGN PATENT DOCUMENTS

JP          03-068280       3/1991

* cited by examiner

*Primary Examiner* — Clayton E Laballe
*Assistant Examiner* — Autumn Parker
(74) *Attorney, Agent, or Firm* — Procopio, Cory, Hargreaves & Savitch LLP

(57) ABSTRACT

An electronic apparatus including a drive mechanism, a signal processing section, an image pickup lens, an image pickup device and a focus control section is described. The drive mechanism changes a position of the image pickup lens relative to the image pickup device. The image pickup device outputs an electric signal of an image at each of a plurality of relative positions. The signal processing section processes the electric signal and generates a digital image signal corresponding to the plurality of relative positions. The focus control section extracts, from the digital image signal, high-frequency components for pixels selected from a focus area set in the image of the digital image signal, calculates a focus evaluation value corresponding to each relative position, identifies a maximum focus evaluation value among the calculated focus evaluation values, and moves the image pickup lens to the relative position that provides the maximum focus evaluation value.

9 Claims, 6 Drawing Sheets

ELECTRONIC APPARATUS HAVING AUTOFOCUS CAMERA FUNCTION

FIELD OF THE INVENTION

The present invention relates to an electronic apparatus having an autofocus camera function, and more specifically to an electronic apparatus having a camera function that performs autofocusing a contrast AF method.

BACKGROUND

In contrast AF systems that are widely used in electronic cameras as autofocus methods, generally, images of a subject are picked up while a focus lens that is included in a photographing optical system and that acts on focus adjustment is moved, and then image signals of the subject are generated. Luminance signals are generated from the generated image signals, and high-frequency components are extracted from the luminance signals. Then, based on the extracted high-frequency components, focus evaluation values that are used to identify an in-focus position are calculated.

The focus lens is driven within a predetermined range, for example, between an infinity position and a close-up position or closest focusing distance position, and the focus evaluation values are calculated at each of a plurality of positions within that range. Then, the position where the focus evaluation value is at the maximum is identified as the in-focus position of the focus lens.

In contrast AF systems, the in-focus position is set to a position of the focus lens or the photographing optical system where the focus evaluation value is at the maximum. However, since there is an upper limit to the focus evaluation value due to configurational limitations (e.g., the number of bits of data in the focus evaluation value) of electronic cameras, an overflow of a calculated focus evaluation value may occur. When any focus evaluation value overflows, the maximum focus evaluation value is not properly identified, and so the focus lens or the photographing optical system may be placed in a false in-focus position.

On the other hand, when each of the focus evaluation values calculated between the infinity position and the close-up position is extremely small, significant differences between the focus evaluation values cannot be obtained, and so the in-focus position may be improperly set.

The present invention provides an electronic apparatus having a camera function, the electronic apparatus realizing high-precision autofocus by performing control so that an overflow of a calculated focus evaluation value is avoided or a focus evaluation value that is large enough to set the in-focus position is calculated.

SUMMARY

An electronic apparatus having a camera function of the present invention includes a drive mechanism that changes the position of an image pickup lens relative to an image pickup device, the image pickup device converting an image of a subject captured via the image pickup lens at each of a plurality of relative positions into an electric signal and outputting the electric signal; a signal processing section that processes the electric signal outputted from the image pickup device for each of the plurality of relative positions and generates a digital image signal corresponding to each relative position; and a focus control section that extracts, from the digital image signal corresponding to each of the plurality of relative positions, high-frequency components for pixels selected from a focus area set in the image of the digital image signal, calculates a focus evaluation value corresponding to each relative position, identifies a maximum focus evaluation value among the calculated focus evaluation values, and moves the image pickup lens to the relative position that provides the maximum focus evaluation value, the focus control section determining whether or not a focus evaluation value corresponding to an initial position of the image pickup lens is contained in a predetermined range and changing the number of pixels to be selected from the focus area in the case where the focus evaluation value corresponding to the initial position is not contained in the predetermined range.

With the electronic apparatus of the present invention, in the case where the focus evaluation value calculated with the image pickup lens being in the initial position exceeds a predefined value, the number of pixels to be selected from the focus area is decreased, and an autofocus process is performed thereafter. Thus, a situation in which a focus evaluation value calculated during the autofocus process overflows is prevented or suppressed.

Moreover, with the electronic apparatus of the present invention, in the case where the focus evaluation value calculated with the image pickup lens being in the initial position is less than a predefined value, the number of pixels to be selected from the focus area is increased, and the autofocus process is performed thereafter. Thus, a situation in which a focus evaluation value that is too small to show a significant difference is computed is prevented or suppressed.

DETAILED DESCRIPTION

Hereinafter, an electronic camera that is an embodiment of the present invention will be described with reference to the accompanying drawings.

Figure 1:
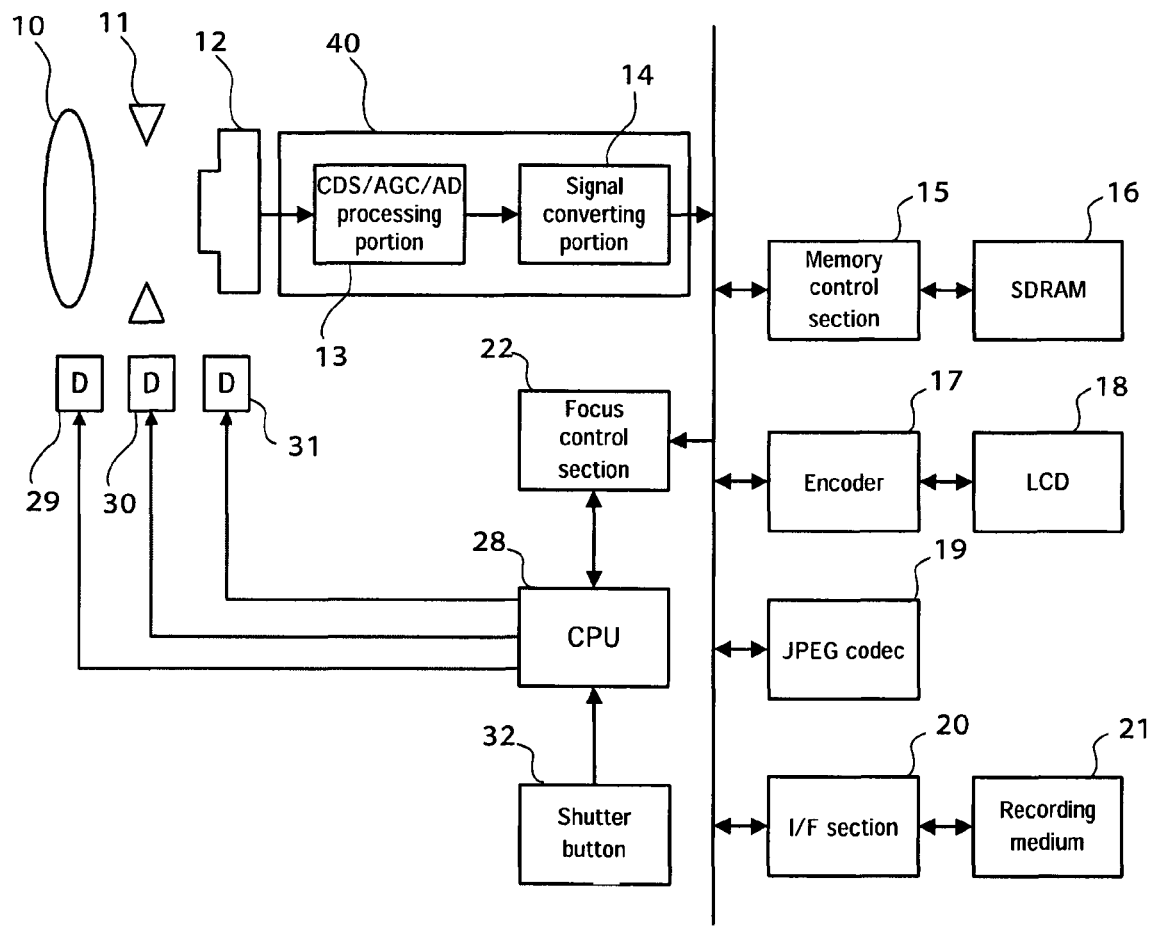
FIG. 1 is a block diagram showing the configuration of an electronic camera that is an embodiment of the present invention.

FIG. 1 is a diagram schematically showing the configuration of the electronic camera that is the embodiment of the present invention. The electronic camera includes an image pickup lens 10, an aperture unit 11, and the like, which constitute a photographing optical system. A light receiving surface or an image pickup surface of a CCD imager 12 is exposed to an optical image of a subject through these optical elements. The CCD imager 12, which is an image pickup device, is provided with an array of pixels, and, on the image pickup surface of the CCD imager 12, electric charges corresponding to the optical image of the subject are accumulated at each of the pixels by photoelectric conversion.

The electronic camera has a drive mechanism that changes the position of the image pickup lens 10 relative to the CCD imager 12 by moving the image pickup lens 10 along the optical axis. The drive mechanism is constituted by a lens driver 29, a motor (or a piezoelectric actuator), which is omitted in the drawings, and the like.

The electronic camera has a liquid crystal display (LCD) 18, and the LCD 18 is used to display an image photographed or recorded. Moreover, the LCD 18 is also used to display a real-time moving image, i.e., a through image, of the subject.

The process of displaying a through image on the LCD 18 is performed in the following manner. First, a central processing unit (CPU) 28 instructs an aperture driver 30 to open the aperture unit 11 and instructs a CCD driver 31 to repeat pre-exposure and readout of electric charges. The aperture driver 30 adjusts the aperture size of the aperture unit 11, and the CCD driver 31 repeatedly performs pre-exposure of the CCD imager 12 and readout of electric charges thus accumulated.

Pre-exposure and readout of electric charges are performed repeatedly in response to, for example, a vertical synchronizing signal that is generated every 1/30 second. Accordingly, a raw image signal corresponding to an optical image of the subject, i.e., an electric signal generated by readout of electric charges, is outputted from the CCD imager 12 at a frame rate of 30 fps. Note that in the process of displaying a through image, electric charges are not read out from all of the pixels of the CCD imager 12, but pixels from which electric charges are read out are decimated.

The low-resolution raw image signal of each frame outputted from the CCD imager 12 is transmitted to a signal processing section 40. The raw image signal is subjected to such processes as noise removal, level adjustment, and A/D conversion in a CDS/AGC/AD processing portion 13 included in the signal processing section 40. As a result, raw image data, which is a digital image signal, is obtained for each frame.

A signal converting portion 14 of the signal processing section 40 performs such processes as white balance adjustment, color separation, and YUV conversion on the raw image data outputted from the CDS/AGC/AD processing portion 13 to generate image data in YUV format, which is a digital image signal. The generated image data is written into an SDRAM 16 by a memory control section 15. The image data recorded in the SDRAM 16 is read out by the memory control section 15 as appropriate.

An encoder 17 converts the image data read out from the SDRAM 16 by the memory control section 15 into a composite video signal in NTSC format, and the obtained composite video signal is transmitted to the LCD 18. As a result, a through image of the subject is displayed on the LCD 18.

Photographing of the subject and recording of the resultant image are performed as will be described below. First, when a shutter button 32 is half-pressed, the CPU 28 instructs a focus control section 22 to execute an AF (autofocus) process. Based on the result outputted from the focus control section 22, the CPU 28 drives the lens driver 29 to place the image pickup lens 10 in the in-focus position. The details of the AF process will be described later.

Next, when the shutter button 32 is fully pressed, the CPU 28 executes an image recording process. The CPU 28 first instructs the CCD driver 31 to perform exposure (main exposure) and readout of electric charges. The CCD driver 31 performs a single exposure of the CCD imager 12 and a single readout of electric charges accumulated during the exposure. Electric charges are read out from all of the pixels of the CCD imager 12. Thus, a high-resolution raw image signal corresponding to an optical image of the subject is outputted from the CCD imager 12.

The raw image signal outputted from the CCD imager 12 is used to generate still image data of the photographed subject in YUV format. The still image data is generated in such a manner as described above. The generated still image data is written into the SDRAM 16 by the memory control section 15. When the CPU 28 issues an image compression instruction to a JPEG codec 19, the JPEG codec 19 reads out the still image data of the photographed subject from the SDRAM 16 through the memory control section 15 and performs JPEG compression on the image data.

The JPEG codec 19 writes the compressed image data, i.e., the JPEG data, generated by JPEG compression into the SDRAM 16 through the memory control section 15. The CPU 28 reads out the JPEG data from the SDRAM 16 through the memory control section 15, generates an image file containing that JPEG data, and records the generated image file on a recording medium 21 through an I/F section 20. For example, a hard disk, a DVD, or a flash memory is used as the recording medium 21. Upon completion of such an image recording process, the above-described through image displaying process is resumed.

Figure 2:
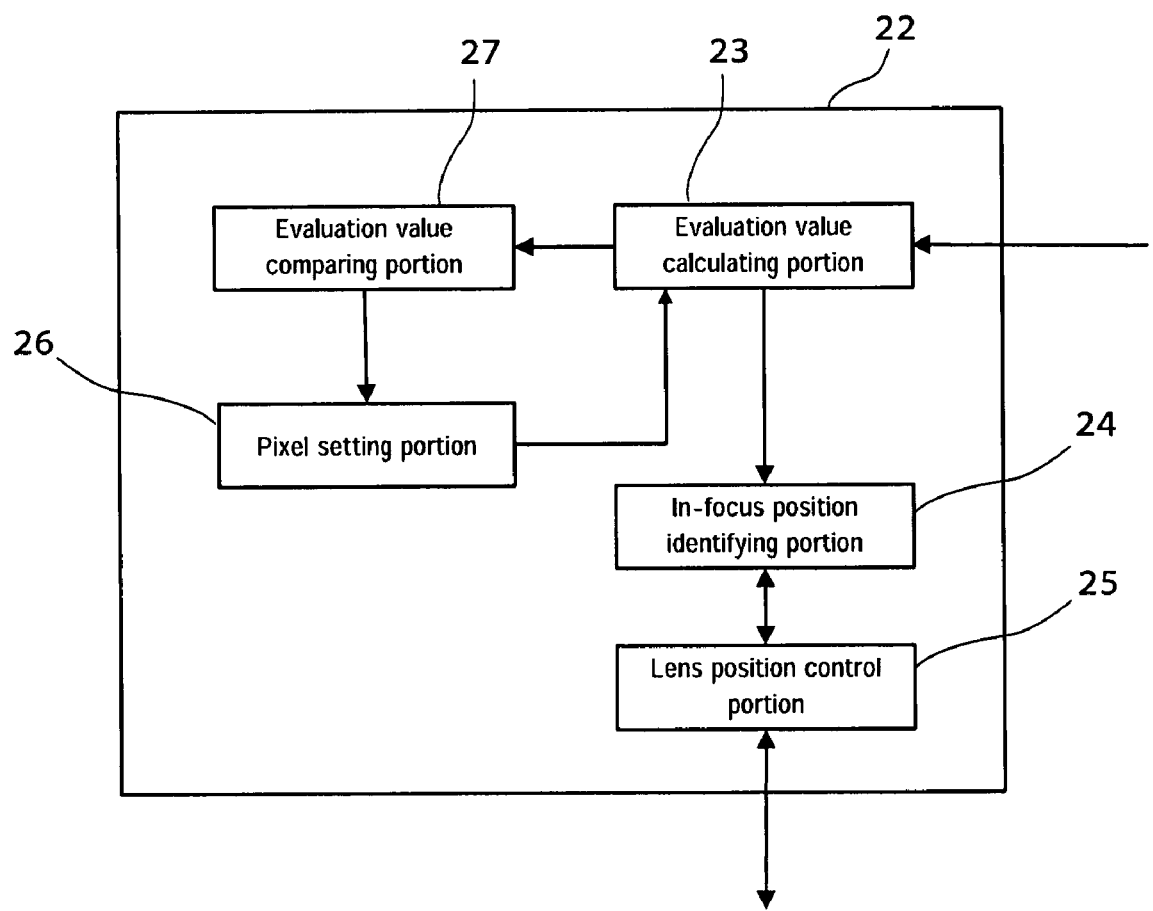
FIG. 2 is a block diagram showing the configuration of a focus control section included in the electronic camera that is the embodiment of the present invention.

Next, the AF process performed by the electronic camera that is the embodiment of the present invention will be described in detail. FIG. 2 is a diagram schematically showing the configuration of the focus control section 22 of the electronic camera. The focus control section 22 includes a pixel setting portion 26, an evaluation value calculating portion 23, an evaluation value comparing portion 27, an in-focus position identifying portion 24, and a lens position control portion 25.

The lens position control portion 25 controls the lens driver 29 of the drive mechanism via the CPU 28, thereby moving the image pickup lens 10 between the infinity position and the close-up position.

The evaluation value calculating portion 23 acquires, from Y data, i.e., luminance data, contained in a single frame of image data in YUV format, which is generated by the signal converting portion 14, luminance data of pixels within a focus area set in the image of the image data and calculates a focus evaluation value. The focus area is, for example, a rectangular region placed in the center of the image (see FIG. 5). The focus area may be set in a position other than the center of the image, or a plurality of focus areas may be set.

Specifically, the evaluation value calculating portion 23 calculates a focus evaluation value by integrating high-frequency components of luminance data for pixels selected from (the pixels within) the focus area. The pixels to be considered in calculating the focus evaluation value are selected based on a pixel setting defined by the pixel setting portion 26. The evaluation value calculating portion 23 outputs focus evaluation values calculated for each frame (i.e., corresponding to respective positions of the image pickup lens 10 between the infinity position and the close-up position) to the in-focus position identifying portion 24. Moreover, the evaluation value calculating portion 23 outputs a focus evaluation value corresponding to an initial position of the image pickup lens 10 to the evaluation value comparing portion 27.

The evaluation value comparing portion 27 determines whether or not the focus evaluation value calculated by the evaluation value calculating portion 23 is within a predetermined range and, furthermore, if the focus evaluation value is not within the predetermined range, determines whether the focus evaluation value exceeds the maximum value of the predetermined range or whether it is less than the minimum value of the predetermined range, and outputs the result of the determination to the pixel setting portion 26. The predetermined range is defined in advance by, for example, performing an experiment, a test, or the like. The minimum value of the predetermined range is taken as, for example, 6% of the largest possible focus evaluation value that can be calculated, i.e., 6% of a dynamic range of the focus evaluation value. The maximum value of the predetermined range is taken as, for example, 12% of the dynamic range.

Figure 4:
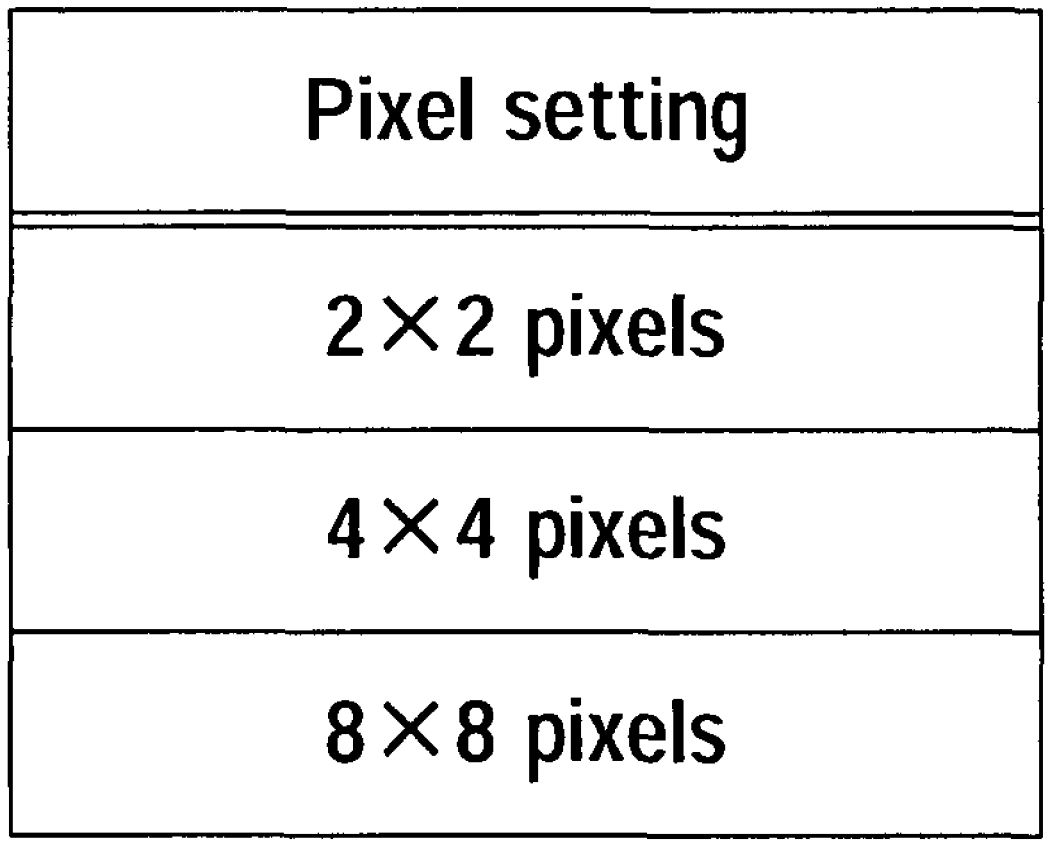
FIG. 4 is an explanatory diagram of a pixel setting list of a pixel setting portion included in the electronic camera that is the embodiment of the present invention.

Based on the result of the determination by the evaluation value comparing portion 27, the pixel setting portion 26 sets pixels to be selected from the focus area by the evaluation value calculating portion 23. In this embodiment, the pixel setting portion 26 has a pixel setting list shown in FIG. 4, selects a pixel setting from the pixel setting list based on the result of the determination by the evaluation value comparing portion 27, and sets the selected pixel setting in the evaluation value calculating portion 23.

Figure 5:
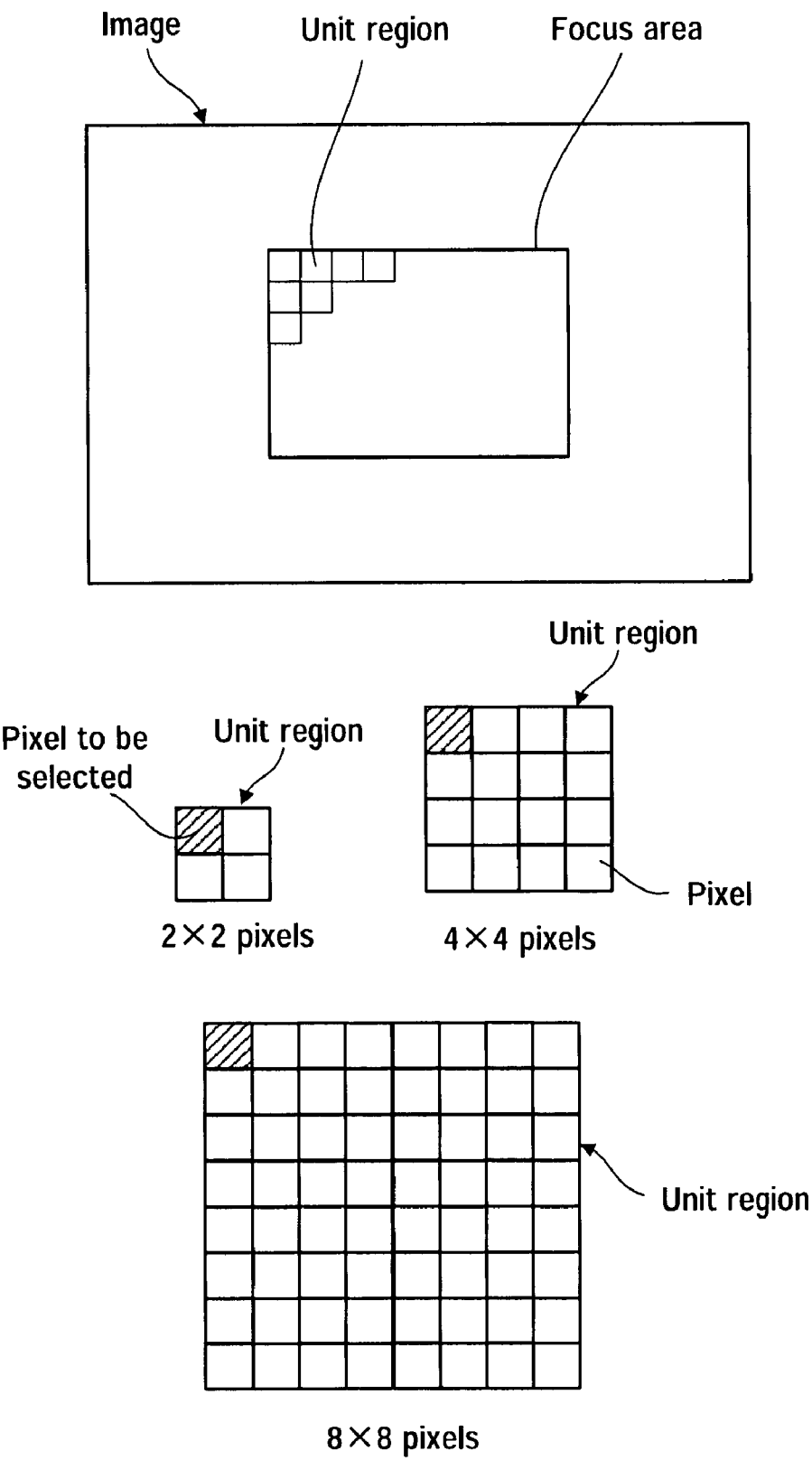
FIG. 5 is an explanatory diagram of pixel setting during the autofocus operation of the electronic camera that is the embodiment of the present invention.

FIG. 5 is an explanatory diagram of pixel settings contained in the pixel setting list. For example, when "2×2 pixels" is selected, pixels within the focus area are selected using a block of 4 pixels arranged in a square, 2 pixels high and 2 pixels wide, as a unit. Specifically, one pixel (indicated by hatching in FIG. 5) located at the top-left corner is selected from each of blocks of "2×2 pixels", i.e., each of unit regions consisting of 4 pixels arranged in a square, contained in the focus area. Note that a pixel located at the top-right corner, the bottom-right corner, or the bottom-left corner may also be selected.

Moreover, when "4×4 pixels" is selected, pixels within the focus area are selected using a block of 16 pixels arranged in a square, 4 pixels high and 4 pixels wide, as a unit. When "8×8 pixels" is selected, pixels within the focus area are selected using a block of 64 pixels arranged in a square, 8 pixels high and 8 pixels wide, as a unit. Even when "4×4 pixels" or "8×8 pixels" is selected, one pixel located at the top-left corner in these unit regions is selected as in the case of "2×2 pixels" (a pixel other than this in the unit regions may also be selected). Note that, in this embodiment, the "4×4 pixels" pixel setting is selected in a default condition or in an initial condition.

If there are 25,600 pixels in the focus area, when "2×2 pixels" is selected as the pixel setting, 6,400 pixels within the focus area are selected using a block of "2×2 pixels" as a unit. Then, high-frequency components of luminance data about those selected pixels are integrated, and thus a focus evaluation value is calculated.

When the pixel setting is changed from "4×4 pixels" to "2×2 pixels", the number of samples used in calculating the focus evaluation value increases, so that the calculated focus evaluation value increases. When the pixel setting is changed from "4×4 pixels" to "8×8 pixels", the number of samples used in calculating the focus evaluation value decreases, so that the calculated focus evaluation value decreases.

The in-focus position identifying portion 24 acquires focus evaluation values calculated by the evaluation value calculating portion 23 on a frame-by-frame basis (or for each position of the image pickup lens 10 between the infinity position and the close-up position). Then, the in-focus position identifying portion 24 identifies the maximum focus evaluation value among the acquired focus evaluation values and outputs information (e.g., a frame number corresponding to the maximum focus evaluation value) that can identify the position of the image pickup lens 10 where the maximum focus evaluation value was computed, i.e., the in-focus position, to the lens position control portion 25. The lens position control portion 25 controls the lens driver 29 via the CPU 28 to move the image pickup lens 10 to the position that provides the maximum focus evaluation value.

Next, referring to a flowchart of FIG. 3, the AF process of the electronic camera of the embodiment of the present invention will be described. The CPU 28 detects whether or not the shutter button 32 is half-pressed (S01). If half-pressing of the shutter button 32 is detected, the CPU 28 instructs the focus control section 22 to start the AF process (S02).

Upon receiving the instruction to execute the AF process from the CPU 28, the lens position control portion 25 controls the lens driver 29 via the CPU 28 to move the image pickup lens 10 to an initial position (S03). In this embodiment, the infinity position is taken as the initial position. Thereafter, one frame of image data of a photographed subject in YUV format is generated with the image pickup lens 10 being in the infinity position. The evaluation value calculating portion 23 calculates a focus evaluation value using the generated image data in such a manner as described above (S04). Note that "4×4 pixels" is set in the evaluation value calculating portion 23 as an initial setting.

Then, the evaluation value comparing portion 27 determines whether or not the focus evaluation value calculated by the evaluation value calculating portion 23 in step S04 is within a predetermined range (S05).

In step S05, if it is determined that the focus evaluation value is within the predetermined range, the lens position control portion 25 starts moving the image pickup lens 10 from the infinity position to the close-up position (S06). While the image pickup lens 10 moves from the infinity position to the close-up position, a single frame of image data in YUV format is generated at each of a plurality of positions (excluding the initial position) between the infinity position and the close-up position, and a focus evaluation value is calculated using that image data. The in-focus position identifying portion 24 compares the focus evaluation values of respective frames calculated by the evaluation value calculating portion 23 (S07) and identifies the maximum focus evaluation value corresponding to the in-focus position (S08). Then, the lens position control portion 25 moves the image pickup lens 10 to the position where the maximum focus evaluation value was calculated, i.e., the in-focus position.

In step S05, if it is determined that the focus evaluation value that is calculated with the image pickup lens 10 being in the infinity position (the focus evaluation value calculated in step S04) is not within the predetermined range, the evaluation value comparing portion 27 determines whether or not the focus evaluation value of the infinity position exceeds the maximum value of the predetermined range (S11). In step S11, if it is determined that the focus evaluation value exceeds the maximum value of the predetermined range, the pixel setting portion 26 changes the pixel setting in the evaluation value calculating portion 23 from "4×4 pixels" to "8×8 pixels" (S12). Accordingly, the number of samples used in calculating a focus evaluation value decreases, and thus an adjustment is made to decrease the calculated focus evaluation value.

In step S11, if the evaluation value comparing portion 27 determines that the focus evaluation value is less than the minimum value of the predetermined range (i.e., if it is determined that the focus evaluation value is outside the predetermined range and the focus evaluation value does not exceed the maximum value of the predetermined range), the pixel setting portion 26 changes the pixel setting in the evaluation value calculating portion 23 from "4×4 pixels" to "2×2 pixels" (S21). Accordingly, the number of samples used in calculating a focus evaluation value increases, and thus an adjustment is made to increase the calculated focus evaluation value.

After step S12 or S21, the evaluation value calculating portion 23 computes a focus evaluation value at the initial position, i.e., the infinity position, based on the changed pixel setting (S22). After step S22, step S06 and the steps that follow step S06 are performed. Note that in steps S07 and S08 that are performed after step S12 or S21, focus evaluation values computed based on the changed pixel setting are compared, and then the in-focus position of the image pickup lens 10 is set.

As described above, in the AF process of the electronic camera of this embodiment, when the focus evaluation value calculated at the initial position is not contained within the predetermined range, focus evaluation values are calculated after changing the pixel setting used in calculating the focus evaluation values. Thus, a situation in which a focus evaluation value overflows (a situation in which a dynamic range is exceeded) or a situation in which a focus evaluation value that is too small to show a significant difference is computed is prevented or suppressed, and therefore high-precision focusing can be performed.

In the electronic camera of the above-described embodiment, it is determined whether or not the focus evaluation value at the initial position of the image pickup lens 10 falls within a predetermined range, and the pixel setting is changed based on the result of the determination. Although the initial position is the infinity position in the embodiment, a position of the image pickup lens 10 other than the infinity position may be taken as the initial position. For example, the close-up position may be taken as the initial position, or the position of the image pickup lens 10 at the time when the AF process is started may be taken as the initial position (in both cases, focus evaluation values are calculated at each of a plurality of lens positions between the infinity position and the close-up position).

In the AF process of the above-described embodiment, the image pickup lens 10 moves. However, instead of the image pickup lens 10, the CCD imager 12 may be moved along the optical axis to change the position of the CCD imager 12 relative to the image pickup lens 10.

In the electronic camera of the above-described embodiment, the pixel setting is selected from "2×2 pixels", "4×4 pixels", and "8×8 pixels", and when "8×8 pixels" is selected, the number of samples used in computing a focus evaluation value is minimized. A pixel setting of "16×16 pixels" may be used instead of "8×8 pixels", or the pixel setting to be used may be selected out of "2×2 pixels", "4×4 pixels", "8×8 pixels", and "16×16 pixels". Moreover, a pixel setting other than these may also be used as long as the object of the present invention can be achieved.

In the electronic camera of the embodiment, all of the pixels of the CCD imager 12 are read out in the AF process, which is started by pressing the shutter button 32 halfway, and the image recording process, which is started by fully pressing the shutter button 32. However, during the AF process, pixels of the CCD imager 12 from which accumulated electric charges are read out may be decimated in the vertical and horizontal directions. In this case, a focus evaluation value is calculated using low-resolution image data generated from an electric signal obtained by decimated readout of the CCD imager 12.

In the electronic camera of the embodiment, the encoder 17 converts image data read out from the SDRAM 16 by the memory control section 15 into a composite video signal in NTSC format, and the composite video signal is provided to the LCD 18. A signal other than the composite video signal in NTSC format may also be provided to the LCD 18, and, for example, it is also possible that the encoder 17 converts the read-out image data into an RGB signal compliant with ITU-R BT.601, and the RGB signal is provided to the LCD 18.

In the electronic camera of the embodiment, the CCD imager 12 is used as an image pickup device. However, a CMOS imager may be used instead. Moreover, although the frame rate of the electronic camera of the embodiment is 30 fps, a frame rate of 15 fps may also be used.

In the electronic camera of the embodiment, a focus evaluation value is calculated by integrating high-frequency components of luminance data for pixels selected from the focus area. However, currently, there are various methods for calculating a focus evaluation value. It should be noted that the present invention is effective for any method in which the number of pixels within the focus area or the number of pixels selected from within the focus area has an influence on the magnitude of a focus evaluation value to be calculated.

In the electronic camera of the embodiment, the pixel setting is changed depending on the results of steps S05 and S11 as described above. However, for example, when an overflow is very unlikely to occur in view of the configuration of an electronic camera, the flowchart of FIG. 3 may be changed so that determination of whether or not the focus evaluation value at the initial position is less than a predetermined value is made in step S05, and then step S06 is performed if the focus evaluation value is not less than the predetermined value or step S21 is performed if the focus evaluation value is less than the predetermined value. Moreover, when a situation in which significant differences between focus evaluation values cannot be obtained is very unlikely to occur in view of the configuration of an electronic camera, the flowchart of FIG. 3 may be changed so that determination of whether or not the focus evaluation value at the initial position exceeds a predetermined value is made in step S05, and then step S06 is performed if the focus evaluation value is not more than the predetermined value or step S12 is performed if the focus evaluation value exceeds the predetermined value.

In the electronic camera of the embodiment, the AF process for setting an in-focus position is started when the shutter button 32 is half-pressed, and it is during the AF process that the changing of the pixel setting, which is a feature of the present invention, is performed. However, such changing of the pixel setting may also be performed before the shutter button 32 is half-pressed, i.e., prior to the AF process.

For example, it is also possible that after a through image is displayed on the LCD 18, determination of whether or not the focus evaluation value at the infinity position of the image pickup lens 10 is within the predetermined range is made, and the pixel setting is changed (depending on the result of the determination). In this case, when the shutter button 32 is half-pressed while a through image is displayed, the AF process is performed with the pixel setting being suitably selected, and it is therefore not necessary to determine whether or not the focus evaluation value at the infinity position is within the predetermined range during the AF process.

Figure 6:
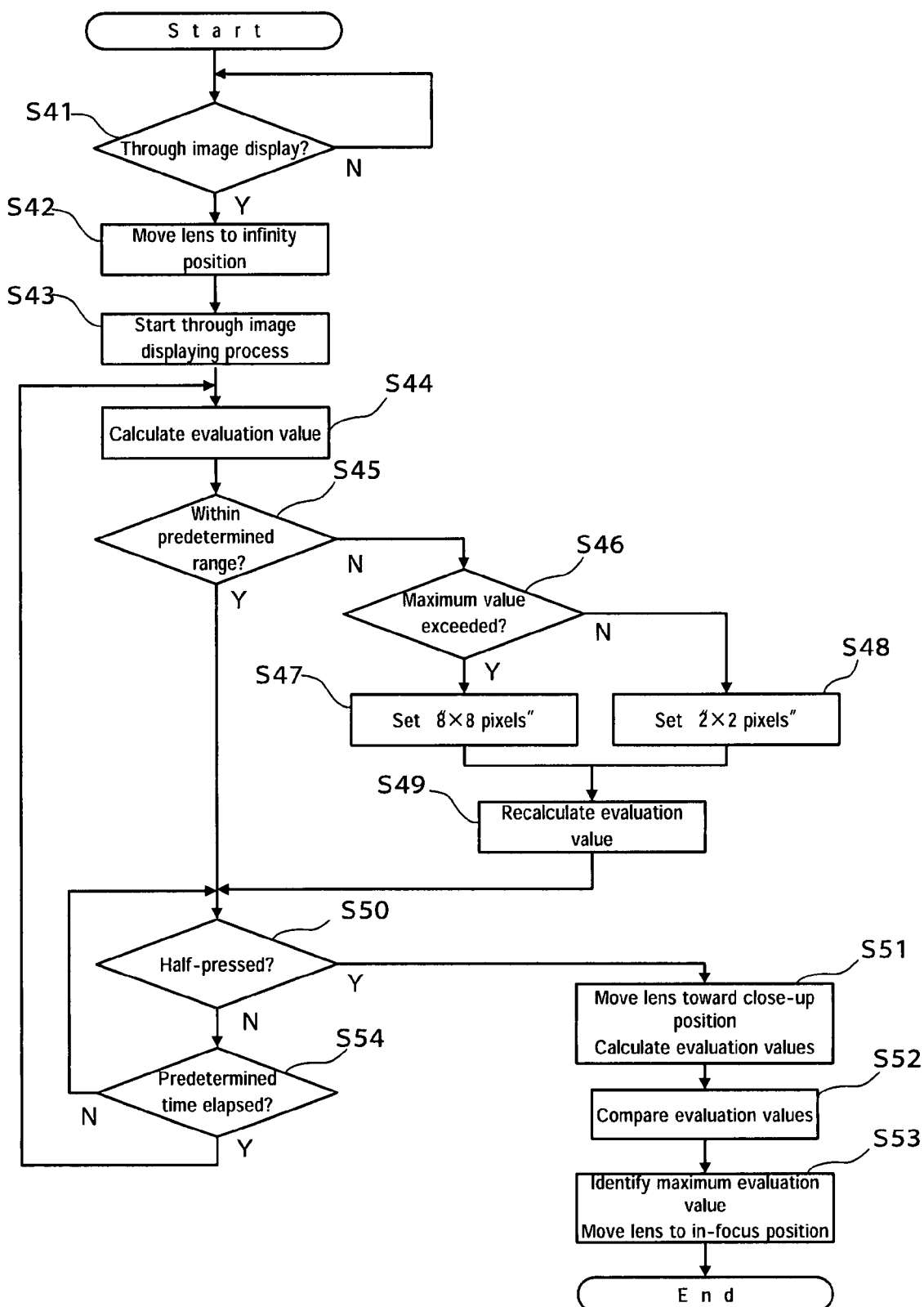
FIG. 6 is a flowchart showing an operation of an electronic camera that is a second embodiment of the present invention.

FIG. 6 is a flowchart showing an operation of an electronic camera that is a second embodiment of the present invention. The CPU 28 determines whether or not a through image displaying process as described above is to be performed (S41). For example, the CPU 28 determines whether or not a photographing mode is selected by operating a mode selection key (not shown) or, at power-on, determines whether or not the photographing mode is set as default.

If it is determined in step S41 that the through image displaying process is to be performed (e.g., if the photographing mode is selected), the lens position control portion 25 moves the image pickup lens to the infinity position, which is the initial position, in response to a command from the CPU 28 (S42). After step S42, the CPU 28 performs a through image displaying process as described above (S43).

Figure 3:
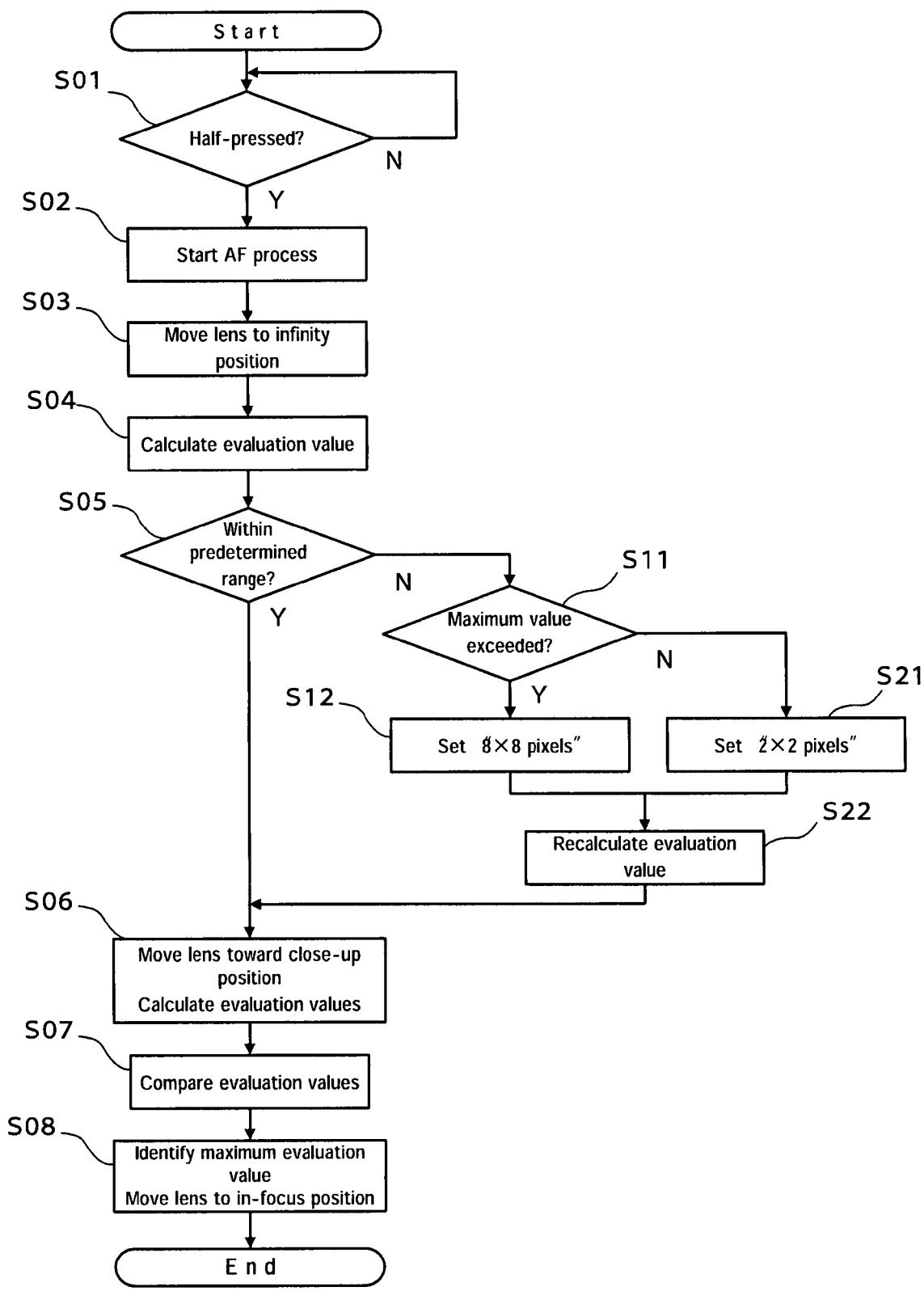
FIG. 3 is a flowchart showing an autofocus operation of the electronic camera that is the embodiment of the present invention.

After step S43, steps S44 and S45, respectively corresponding to steps S04 and S05 shown in FIG. 3, are performed. Moreover, if it is determined in step S45 that a focus evaluation value of the infinity position calculated in step S44 is outside a predetermined range, step S46, corresponding to step S11, is performed. Then, depending on the result of step S46, step S47, corresponding to step S12, or step S48, corresponding to step S21, is performed. After step S47 or S48, step S49, corresponding to step S22, is performed.

After step S49 or in step S45, if it is determined that the focus evaluation value of the infinity position calculated in step S44 is contained in the predetermined range, the CPU 28 detects whether or not the shutter button 32 is half-pressed (S50). If the shutter button 32 is half-pressed, steps S51, S52, and S53, respectively corresponding to steps S06, S07, and S08 shown in FIG. 3, are performed after step S50.

In step S50, if half-pressing of the shutter button 32 is not detected, the CPU 28 determines whether a predetermined time has elapsed after the completion of step S44 (S54). Until the predetermined time has elapsed, detection of whether or not there is any half-pressing of the shutter button 32 is performed by step S50. When the predetermined time has elapsed without any half-pressing of the shutter button 32 being detected, step S44 and the steps that follow step S44 are performed again after step S54. Thus, a suitable pixel setting is made in accordance with changes of the photographing environment or the subject.

In addition to electronic cameras, the present invention can be applied to various electronic apparatuses having a camera function. For example, the present invention can be applied to a cellular phone having a camera function, a notebook computer having a camera function, and a portable game machine having a camera function. Many of such electronic apparatuses are not provided with an operating means corresponding to the shutter button 32 that can be half-pressed. For example, in a common cellular phone having a camera function, when an enter key is pressed while a through image is displayed, an AF process and, furthermore, a process for photographing and recording an image of a subject are performed.

When the present invention is applied to such an electronic apparatus that additionally has a camera function, and the operation shown in FIG. 3 is performed, it will be determined in step S01 of FIG. 3 whether or not an operating means for directing that photographing and recording of an image be performed is operated (e.g., whether or not an enter key of a cellular phone is pressed). Then, after the AF process is completed in step S08, the process for photographing and recording an image will subsequently be performed. Moreover, when the present invention is applied to such an electronic apparatus that additionally has a camera function, and the operation shown in FIG. 6 is performed, it will be determined in step S50 of FIG. 6 whether or not an operating means for directing that photographing and recording of an image be performed is operated, and the process for photographing and recording an image will be performed after step S53.

In the operation shown in the flowchart of FIG. 3, when a focus evaluation value computed based on the default pixel setting, "4×4 pixels", with the image pickup lens 10 being in the initial position is outside the predetermined range, the pixel setting is changed to "2×2 pixels" or "8×8 pixels". However, in the present invention, the pixel setting may be further changed, if necessary, after the changing of the pixel setting.

For example, after step S22 of the flowchart of FIG. 3, determination of whether or not a recalculated focus evaluation value is within the predetermined range and, furthermore, determination of whether the recalculated value exceeds the maximum value of the predetermined range or whether the recalculated value is less than the minimum value of the predetermined range may be made. Then, if the focus evaluation value recalculated based on the pixel setting of "8×8 pixels" exceeds the maximum value of the predetermined range, a process of changing the pixel setting from "8×8 pixels" to, for example, "16×16 pixels" and recalculating the focus evaluation value may be performed, and if the focus evaluation value recalculated based on the pixel setting of "2×2 pixels" is less than the minimum value of the predetermined range, a process of changing the pixel setting from "2×2 pixels" to, for example, "1×1 pixel" (i.e., all of the pixels contained in the focus area are selected) and recalculating the focus evaluation value may be performed. This also applies to the flowchart of FIG. 6. Note that, as described above, there is no limitation on the pixel setting used in the present invention, and, for example, the pixel setting may be changed in such a manner that the pixel setting shifts from the default "8×8 pixels" to "16×16 pixels" and further to "32×32 pixels", or the pixel setting may be changed in such a manner that the pixel setting shifts from the default "8×8 pixels" to "4×4 pixels" and further to "2×2 pixels".

The foregoing description of the embodiments is solely intended to illustrate the invention and should not be construed as limiting the present invention as set forth in the claims or restricting the scope of the claims. It goes without saying that the configuration of each part of the present invention is not limited to the foregoing embodiments, and various modifications are possible within the technical scope indicated by the claims.

What is claimed is:

1. An electronic apparatus having a camera function, the electronic apparatus including an image pickup lens and an image pickup device, the electronic apparatus comprising:

a drive mechanism that changes a position of the image pickup lens relative to the image pickup device, the image pickup device converting an image of a subject captured via the image pickup lens at each of a plurality of relative positions into an electric signal and outputting the electric signal;

a signal processing section that processes the electric signal outputted from the image pickup device for each of the plurality of relative positions and generates a digital image signal corresponding to each relative position; and a focus control section that extracts, from the digital image signal corresponding to each of the plurality of relative positions, high-frequency components for a number of pixels selected from a focus area set in the image of the digital image signal, calculates a focus evaluation value corresponding to each relative position, identifies a maximum focus evaluation value among the calculated focus evaluation values, and moves the image pickup lens to the relative position that provides the maximum focus evaluation value, the focus control section determining whether or not a focus evaluation value corresponding to an initial position of the image pickup lens is contained in a predetermined range and changing the number of pixels to be selected from the focus area in the case where the focus evaluation value corresponding to the initial position is not contained in the predetermined range.

2. The electronic apparatus according to claim 1, wherein in the case where the focus evaluation value corresponding to the initial position of the image pickup lens exceeds the maximum value of the predetermined range, the focus control section decreases the number of pixels to be selected from the focus area, and in the case where that focus evaluation value corresponding to the initial position of the image pickup lens is less than a minimum value of the predetermined range, the focus control section increases the number of pixels to be selected from the focus area.

3. The electronic apparatus according to claim 2, wherein one pixel in every unit region constituted by a predetermined number of pixels is selected from the focus area.

4. The electronic apparatus according to claim 3, wherein the focus control section decreases the number of pixels to be selected from the focus area by increasing the number of pixels constituting the unit region and increases the number of pixels to be selected from the focus area by decreasing the number of pixels constituting the unit region.

5. The electronic apparatus according to claim 1, wherein the initial position is an infinity position of the image pickup lens.

6. The electronic apparatus according to claim 1, wherein the focus control section calculates the focus evaluation value by integrating high-frequency components of the digital image signal for the number of pixels selected from the focus area.

7. The electronic apparatus according to claim 1, wherein one pixel in every unit region constituted by a predetermined number of pixels is selected from the focus area.

8. An electronic apparatus having a camera function, the electronic apparatus including an image pickup lens and an image pickup device, the electronic apparatus comprising:
a drive mechanism that changes a position of the image pickup lens relative to the image pickup device, the image pickup device converting an image of a subject captured via the image pickup lens at each of a plurality of relative positions into an electric signal and outputs the electric signal;
a signal processing section that processes the electric signal outputted from the image pickup device for each of the plurality of relative positions and generates a digital image signal corresponding to each relative position; and
a focus control section that extracts, from the digital image signal corresponding to each of the plurality of relative positions, high-frequency components for a number of pixels selected from a focus area set in the image of the digital image signal, calculates a focus evaluation value corresponding to each relative position, identifies a maximum focus evaluation value among the calculated focus evaluation values, and moves the image pickup lens to the relative position that provides the maximum focus evaluation value,
the focus control section determining whether or not a focus evaluation value corresponding to an initial position of the image pickup lens exceeds a predetermined value and decreasing the number of pixels to be selected from the focus area in the case where the focus evaluation value corresponding to the initial position exceeds the predetermined value.

9. An electronic apparatus having a camera function, the electronic apparatus including an image pickup lens and an image pickup device, the electronic apparatus comprising:
a drive mechanism that changes a position of the image pickup lens relative to the image pickup device, the image pickup device converting an image of a subject captured via the image pickup lens at each of a plurality of relative positions into an electric signal and outputting the electric signal;
a signal processing section that processes the electric signal outputted from the image pickup device for each of the plurality of relative positions and generates a digital image signal corresponding to each relative position; and
a focus control section that extracts, from the digital image signal corresponding to each of the plurality of relative positions, high-frequency components for a number of pixels selected from a focus area set in the image of the digital image signal, calculates a focus evaluation value corresponding to each relative position, identifies a maximum focus evaluation value among the calculated focus evaluation values, and moves the image pickup lens to the relative position that provides the maximum focus evaluation value,
the focus control section determining whether or not a focus evaluation value corresponding to an initial position of the image pickup lens is less than a predetermined value and increasing the number of pixels to be selected from the focus area in the case where the focus evaluation value corresponding to the initial position is less than the predetermined value.

* * * * *